United States Patent [19]

Clark

[11] 4,095,193
[45] June 13, 1978

[54] BROADBAND GAS LASER

[75] Inventor: George L. Clark, Manhattan Beach, Calif.

[73] Assignee: TRW Inc., Redondo Beach, Calif.

[21] Appl. No.: 651,493

[22] Filed: Jan. 22, 1976

[51] Int. Cl.² ............................................. H01S 3/00
[52] U.S. Cl. ............................................. 331/94.5 G
[58] Field of Search ................ 330/4.3; 239/265.11;
  331/94.5; 60/257; 138/40, 44

[56] References Cited
U.S. PATENT DOCUMENTS

| 3,860,885 | 1/1975 | McLafferty | 331/94.5 P |
| 3,904,983 | 9/1975 | Moreno et al. | 331/94.5 C |

*Primary Examiner*—William L. Sikes
*Attorney, Agent, or Firm*—R. W. Keller; B. DeWitt; D. R. Nyhagen

[57] ABSTRACT

A gas laser having a bandwidth which substantially exceeds the normal doppler bandwidth. To this end the lasing beam is made to propagate at an angle to the direction of flow of the stream of lasing gases. The gases should move at a supersonic speed so that the normal doppler bandwidth of the laser is shifted up or down in frequency by a predetermined amount. By utilizing two or more gas flows at different angles to each other, the normal amplification band of the laser medium can be shifted up and down in frequency by different amounts to obtain an overall bandwidth on the order of 1 – 2 gigahertz (ghz).

4 Claims, 6 Drawing Figures

BROADBAND GAS LASER

BACKGROUND OF THE INVENTION

This invention relates generally to gas lasers and particularly relates to a gas laser having supersonic flow of the lasing gases and means for shifting the normal doppler bandwidth of the laser by a predetermined amount.

For various purposes it is desirable to provide a high energy laser having a large bandwidth. Such a bandwidth, for example, is useful for frequency modulation. For example, a chirp radar provides a signal where the frequency is swept over a certain frequency range. The received signal can then be compressed to generate a pulse having a small width in time, which technique is called pulse compression. The larger the bandwidth of the laser the greater the resulting compression and the more precisely the time of arrival of the pulse can be determined.

A laser having a large bandwidth can, therefore, be used as an optical radar which provides great range resolution. The range resolution is generally proportional to the compressed pulse length which in turn is inversely proportional to the bandwidth. Hence, the range resolution is inversely proportional to the bandwidth. This can, for example, be achieved by a laser of glass doped with neodymium. Such a laser has a very wide linewidth which permits to measure range within a fraction of a centimeter. Unfortunately, the neodymium doped lasers are not only very inefficient, but also have a low average power output.

On the other hand, chemical lasers are very efficient and have great average power capability. Hence, chemical lasers should be highly suitable for the purposes indicated above. However, the problem is that the bandwidths of all known chemical lasers are insufficient. By way of example, a DF laser has a bandwidth at full width half maximum of 350 mhz (megahertz) at an intensity of 1/e. An HF laser at the same intensity has a bandwidth of only about 250 mhz. On the other hand, for the purposes discussed the bandwidth needed is about 1.5 ghz.

It is, therefore, an object of the present invention to provide a gas laser having a bandwidth which substantially exceeds the normal doppler bandwidth.

A further object of the present invention is to adjust the bandwidth of a gas laser to the desired value in accordance with the flow velocity of the lasing gases.

Still a further object of the present invention is to provide a broadband gas laser of the type discussed where the gain profile, that is the gain as a function of frequency, can be tailored for any particular need.

SUMMARY OF THE INVENTION

In accordance with the present invention there is provided a gas laser having a large bandwidth on the order of 1 ghz or more. Such a gas laser should have a supersonic flow of the lasing gases. This means a directed flow of the molecules of more than 600 mph or about 3 kilometers per second. Among these lasers are chemical lasers such as both DF and HF lasers where hydrogen or deuterium is reacted with fluorine gas. The resulting molecules are in an excited state and hence can be stimulated to emit light. The invention can also be used with other lasers which have supersonic flow such as $CO_2$ gas-dynamic lasers. The gas dynamic laser utilizes both $CO_2$ and $N_2$. While the excited levels of the $CO_2$ decay rapidly, those of the $N_2$ decay very slowly. The $N_2$ molecules, however, can transfer their energy very efficiently to one of the upper levels of the $CO_2$ molecules. The excited $CO_2$ will then exhibit optical gain.

The lasing gases are made to issue in the predetermined direction of flow. This may be accomplished by a single nozzle bank where all the nozzles are at the same angle to produce a gas flow of approximate uniform direction and velocity. In accordance with the present invention the flow of gas is so arranged that it makes an angle with the direction of the propagation of the laser beam. In this case, the flowing gain medium exhibits optical gain for a group of frequencies, that is shifted away from the normal frequencies of optical gain. The frequency shift equals the doppler shift corresponding to the component of the flow velocity along the beam axis. The most effective portion of the gain region of a chemical laser is close to the nozzle bank. Hence, a special design of the nozzle bank may be required so that this region is accessible to a beam propogated at an angle to the gas flow.

In order to obtain a wide amplification bandwidth, it is only necessary to arrange a multiplicity of gain regions along the optical path in such a manner that different gain regions have their gas flow directions at different angles to the optical path. This may be accomplished, for example, by providing two or more banks of nozzles so that each bank forms a different angle with its laser beam. If the beam axis is at an angle to the gas flow and if the axis is traversed in both directions, the gain profile of the medium is shifted in opposite directions corresponding to the two directions of propagation. This is true for a laser oscillator, as well as a laser amplifier providing a double pass. It is also feasible to provide a multiplicity of individual nozzles producing different flow directions of the gas for the same nozzle bank. This will provide a nearly continuous spectrum of frequency shifts. As a result, a very smooth, wide, amplification bandwidth is obtained.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
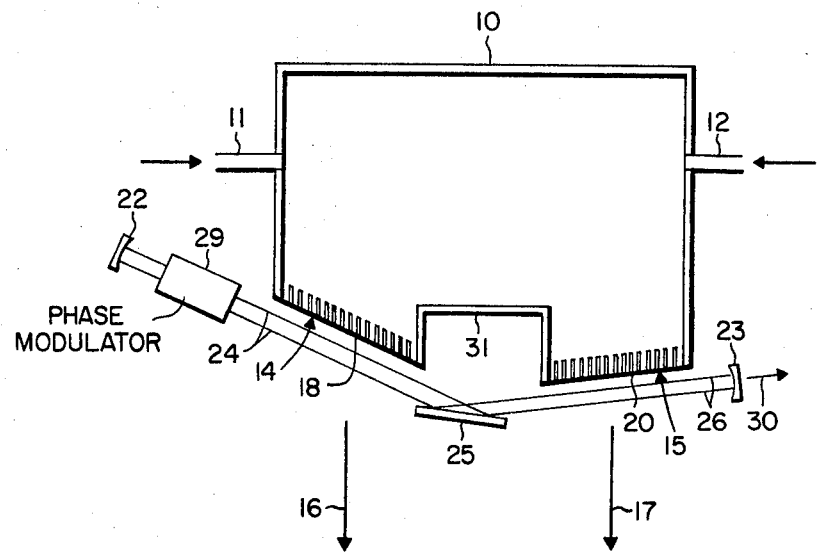
FIG. 1 is a schematic view of a chemical laser oscillator in accordance with the present invention having two banks of nozzles each forming a different angle with an associated laser beam.

Referring now to FIG. 1, there is illustrated apparatus for generating a broadband laser beam in accordance with the present invention. By way of example, the broadband laser may be a chemical laser although other gas lasers may be used instead. The apparatus of FIG. 1 includes a plenum chamber 10 into which the two reacting gases are fed by input pipes 11 and 12. Thus, by way of example, the fluorine gas may be introduced through the input port 11, while the hydrogen or deuterium as the case may be, is applied to the plenum chamber by the input port 12. The purpose of the reaction is to generate atomic fluorine (F). Hence, for a DF laser the reacting gases should be fluorine and hydrogen, while for an HF laser dueterium must be supplied instead of hydrogen.

The chemical reaction which generates the laser light takes place in the two banks of nozzles 14 and 15 by an addition of either hydrogen or deuterium to the atomic fluorine.

Figure 2:
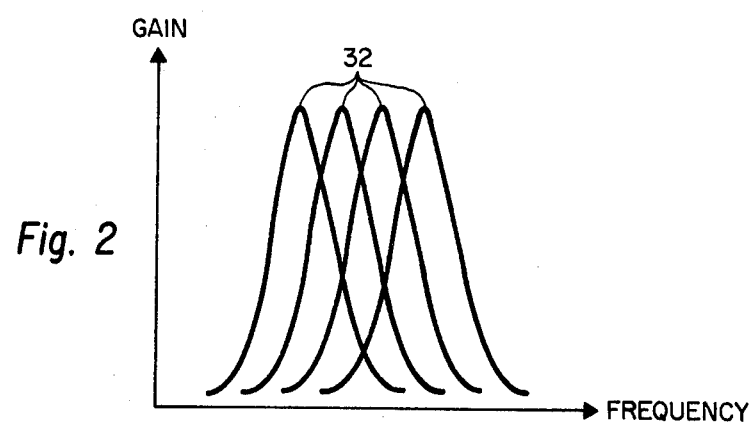
FIG. 2 shows the gain profile as a function of frequency of the laser beam having passed the two banks of nozzles in opposite directions.

As will be readily apparent from FIGS. 1 and 2, banks of nozzles 14 and 15 are inclined at different angles. The construction of the nozzles will be explained subsequently in connection with FIG. 3.

Hence, the optically excited HF or DF issues from the nozzle bank in the direction of arrow 16. On the other hand, the excited gases leave the nozzle bank 15 as shown by the arrow 17. However, since the plane 18 of the nozzle bank 14 is inclined with respect to the arrow 16, the gain region is formed in the immediate neighborhood of the plane 18, that is at an angle to the direction of flow of the gases. Similarly, a gain region is formed in the neighborhood of the plane 20 which terminates the nozzle bank 15.

Assuming that a chemical laser oscillator is desired, a pair of mirrors 22 and 23 is provided to form an optical resonant cavity. An optical axis 24 will be reflected by the mirror 22 to propagate parallel to the nozzle plane 18. This laser beam may be reflected by a plane mirror 25 to form a second laser beam 26 which is directed parallel to the nozzle plane 20. The mirrors 22 and 23 may be plane or spherical as shown. One of the mirrors such as the mirror 22 should be totally reflecting while the other mirror 23 should be partially transparent to the light to generate an output laser beam 30. A wall 31 may interconnect the two nozzle banks 14 and 15 to provide a generally enclosed plenum chamber.

It is also feasible to include an electro optic phase modulator 29 in the path of the laser beam 26 as shown in FIG. 1. By modulating the modulator 29 the optical length of the cavity is varied. This way, for example, be accomplished by applying a periodic ramp voltage waveform to the modulator 29. In this manner the frequency of the oscillator can be swept over the entire available bandwidth. Without such a modulator the oscillator of FIG. 1 would, of course, oscillate at more than one frequency but may not always utilize the entire available bandwidth.

The natural linewidth or doppler bandwidth of a laser can be shifted in accordance with the present invention by causing the laser beam to move in a direction at an angle to the supersonic flow of the gases. This will shift the natural linewidth by an amount given as follows:

$$\Delta f = v/\lambda \qquad (1)$$

In this formula $\Delta f$ is the shift in frequency of the linewidth, $v$ is the velocity component of the molecules in the direction of the laser beam and $\lambda$ is the central wavelength of the laser beam. It can be readily shown that the frequency shift is simply added or subtracted from the normal doppler width or gain profile of the beam. The photons that approach a group of excited molecules that are moving towards the photons see a gain profile tuned to a shorter wavelength range and vice versa.

It will be realized that since the laser beams 24 and 26 will move in opposite directions, the frequency shifts will also occur in opposite directions. Each of the two nozzle banks 14 and 15 will cause a frequency shift of a different amount corresponding to the angle between the laser beam and the flow of the gases.

By way of example, the frequency shift can be calculated from formula (1). This is shown by the following table which shows the number of peaks of each of the frequency shifted doppler bandwidths for a DF laser, the overall widths of the resulting beam in Mhz. This is calculated for the full width half maximum. The last column shows the nozzle angles. It will be evident from Table 1 that more than one or two nozzle banks may be provided to obtain the desired bandwidth.

Table 1

| Number of Peaks | Widtth/MHz | Nozzle Angles |
|---|---|---|
| 1 | 282 | 90° |
| 2 | 486 | 82.5° |
| 3 | 715 | 90° 75° |
| 4 | 961 | 82.5° 67° |
| 6 | 1450 | 82.5° 67° 49.5° |
| 7 |  | 90° 75° 59° 38.5° |
| 8 | 1930 | 82.5° 67° 49.5° 24° |

It will be evident from the table that bandwidths of about 1.5 Ghz are obtainable with a minimum nozzle angle of about 50°.

Figure 5:
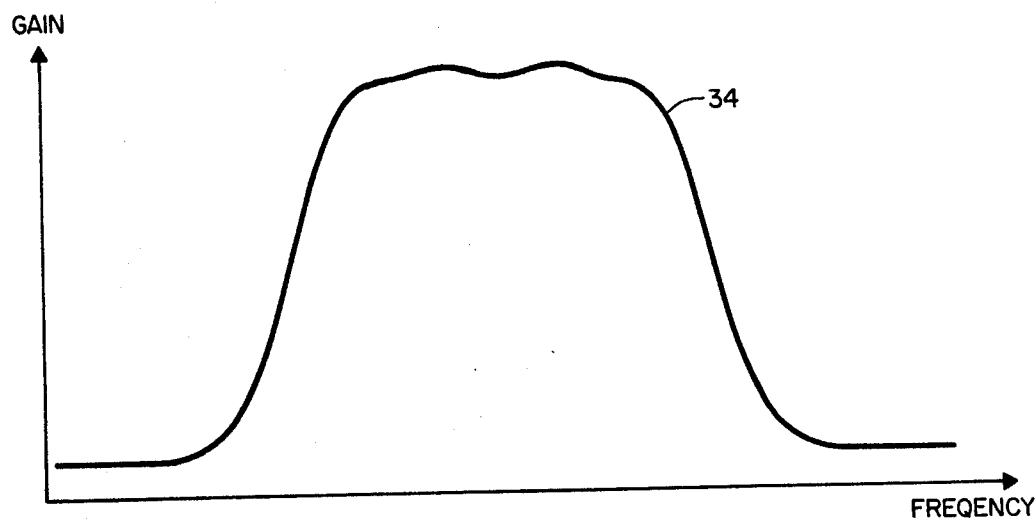
FIG. 5 illustrates a compound gain profile obtainable with the laser of FIG. 1 corresponding to the gain profile of FIG. 2.

FIG. 2 shows by way of example four frequency shifted gain profiles 32 where the gain is plotted as a function of frequency. The superposition of the four gain profiles of FIG. 2 has been illustrated in FIG. 5 where curve 34 shows the overall gain as a function of frequency. The shape of the gain curve depends upon how far apart in frequency the centers of adjacent gain profiles are. By calculating the maximum width without causing double peaks a relatively smooth curve may be obtained as shown in FIG. 5. This can be calculated from the following formula.

$$|f_2 - f_1| = \sqrt{2}\,\Delta f \qquad (2)$$

In this formula $f_1$ and $f_2$ are the respective centers of two adjacent gain profiles.

It is also feasible to adjust or vary the heights of different portions of the gain profile. This may be effected by altering the length say of the nozzle bank 14 with respect to that of the nozzle bank 15. Furthermore, by utilizing different groups of molecules for different parts of the gain distribution a control may be obtained over the saturation of the gain. This in turn should make it possible to operate long amplifier chains without the problem that the signal in the center of the band is amplified more than a signal at the outer ends or wings of the gain profile.

Figure 3:
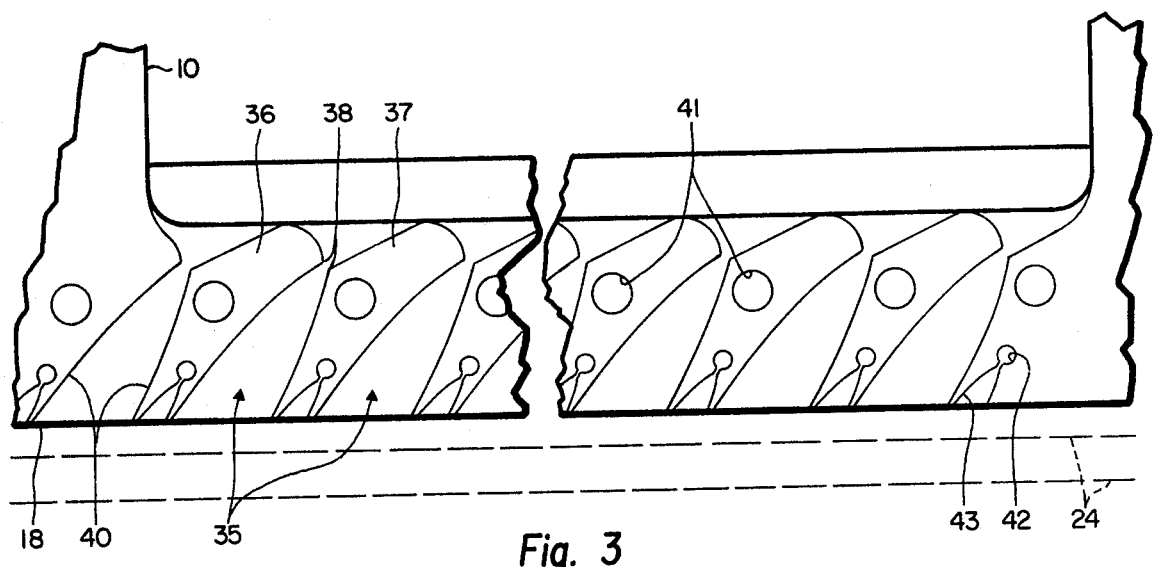
FIG. 3 is a cross-sectional view on enlarged scale of a bank of nozzles which may be used with the laser of FIG. 1.

FIG. 3 to which reference is now made, shows by way of example the construction of a bank of nozzles. A portion of the plenum 10 is shown with a plurality of nozzles 35. Each nozzle 35 is defined by a pair of walls 36 and 37 defining generally a venturi tube having a throat 38 and a widening portion 40 to promote the supersonic gas flow. Since the gases are rather hot, the walls 36 and 37 must be cooled and to this end a cooling medium may be caused to flow through the conduits 41 in the walls. The reacting gases, either hydrogen or deuterium, as the case may be are applied to the conduits 42 and emerge through the openings 43. Hence the chemical reaction which lases takes place in the space beyond the plenum 10. It will be noted that the nozzles form a plane 18 and the flow of the laser beam 24 is shown by dotted lines. It will be realized that the laser beam must form in the immediate vicinity of the nozzle exits.

It will also be realized that the chemical laser as shown in FIG. 1 need not be operated as an oscillator but could also be used as an amplifier. In that case, the mirrors 22 and 23 are omitted and the laser beam to be amplified is directed along the direction of laser beams 24 and 26. The mirror 25 is retained to cause the laser beam to change direction. It will also be realized that in the case of a laser amplifier the laser beam generally will only pass the two nozzle banks once rather than twice. As a result, the doppler bandwidth is shifted in only one direction rather than two.

Instead of having one or more nozzles banks so arranged that the laser beam forms an angle with the direction of flow of the gases, it is also feasible to provide a plurality of nozzles, each of which, or at least some of which, form an angle with the others. Such an apparatus has been illustrated in FIG. 4 to which reference is now made. As clearly shown in FIG. 4, the individual nozzles 50 form each a different angle with a center axis 51. This in turn will create a plurality of doppler shifted components. As illustrated by the arrows 52, the direction of flow of the gases is divergent. As a result, a compound gain profile may be obtained which has a perfect flat top.

It should be noted that the maximum doppler shift which can be obtained in accordance with the present invention is the normal line width of the laser multiplied by the mach number of the flow. This is, of course, an upper limit which cannot be practically achieved. The greatest shift is obtained by making the angle between the flow direction and the direction of the laser beam very small and this may be difficult to accomplish in view of the physical interference between the laser mirrors and the nozzles.

Figure 4:
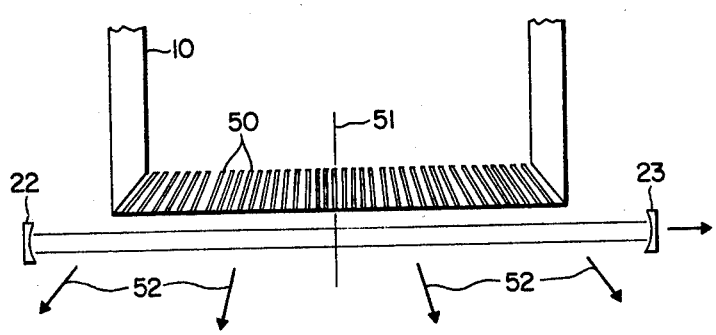
FIG. 4 is a schematic view of a chemical laser oscillator showing another embodiment of the present invention where each of a plurality of nozzles makes a different angle with the other nozzles to provide a divergent flow of the lasing gases.

It will again be understood that although FIG. 4 illustrates a laser oscillator with an optical resonant cavity formed by the mirrors 22, 23, the apparatus may also be operated as an amplifier in the manner previously described.

Figure 6:
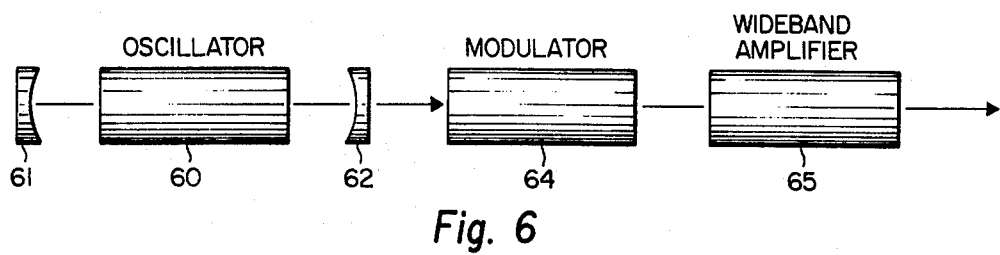
FIG. 6 is a block diagram illustrating schematically how the broadband laser of the invention may be used as a wideband amplifier in combination with a conventional master oscillator and frequency modulator.

The present invention may also be applied to a wideband amplifier. This has been shown by way of example in FIG. 6 to which reference is now made. This figure shows schematically a master oscillator 60 and two reflectors 61 and 62 which jointly define an optical resonant cavity. The reflector 62 may be followed by a frequency modulator 64 which is then followed by a wideband amplifier 65 which may, for example, be the amplifier illustrated in FIGS. 1 and 4. The master oscillator 60 could be a normal narrowband laser. The frequency modulator 64 may, for example, be a frequency chirp.

There has thus been disclosed a chemical laser which can be made to operate over a broad band much broader than the normal gain profile caused by the Gaussian distribution of the molecules. Such a laser still has all the desirable properties of a chemical laser, that is high power and operation in the infrared. It is also feasible to provide several frequency shifted gain profiles to adjust the overall gain profile. In addition, it is possible to adjust the gain of the frequency range so that a flat topped gain curve can be obtained with very steep sides. This will facilitate use of the laser as an amplifier over the entire gain profile frequency range.

What is claimed is:

1. A broadband gas laser of the type having supersonic flow of the lasing gases, said laser comprising:
    (a) a supply of lasing gases;
    (b) means for creating a population inversion in the lasing gases;
    (c) a plurality of nozzles through which the lasing gases issue, each of said nozzles having a face, said faces being aligned substantially along a straight line, and each of said nozzles having a central axis defining substantially the direction of flow of the gases; and
    (d) means providing an optical cavity and for causing a lasing beam to propagate adjacent to the faces of said nozzles, said nozzles being so disposed and arranged that the direction of flow of the gases forms a predetermined acute angle substantially less than 90° with the laser beam, whereby the doppler distribution of the laser frequency is shifted by an amount depending on said predetermined angle.

2. A laser as defined in claim 1 wherein two banks of nozzles are provided and wherein the central axis of the nozzles of each bank forms a different predetermined angle with the associated laser beam, whereby the doppler frequency distribution of the laser beam is shifted by two predetermined amounts dependent upon the two angles.

3. A broadband gas laser oscillator of the type having supersonic flow of the lasing gases, said laser comprising:
    (a) a supply of lasing gases;
    (b) means for creating a population inversion in the lasing gases;
    (c) a first bank of nozzles for issuing the lasing gases;
    (d) a second bank of nozzles for issuing the lasing gases, each of said nozzles having a central axis and a face, said central axes being substantially parallel to each other, the face of the nozzles of each bank forming substantially a straight line, the straight line passing through the faces of the nozzles of said first bank forming a predetermined acute angle with the straight line passing through the faces of the nozzles of said second bank, said central axes defining substantially the direction of flow of the gases; and
    (e) means providing an optical cavity and for directing a laser beam in opposite directions and substantially parallel to the faces of said nozzles and past said banks of nozzles, thereby to shift the doppler frequency distribution of the laser beam in opposite directions by the laser beam encountering the gas molecules from each bank of nozzles at a predetermined different angle.

4. A broadband gas laser of the type having a supersonic flow of the lasing gases, said laser comprising:
 (a) a supply of lasing gases;
 (b) means for creating a population inversion in the lasing gases;
 (c) a plurality of nozzles for issuing the lasing gases, each nozzle having a face and a central axis, the central axes of some of said nozzles having a predetermined acute angle different from that of some other nozzles, the central axes of each of said nozzles defining a direction of flow of the gases issuing therefrom, thereby to issue a stream of gases with at least two different directions; and
 (d) means for passing a laser beam adjacent to the faces of said nozzles, whereby the doppler distribution of the gain profile of the laser is shifted by a predetermined amount due to the angle between the central axes of the nozzles.

* * * * *